(12) United States Patent
Raghu

(10) Patent No.: US 10,073,459 B2
(45) Date of Patent: Sep. 11, 2018

(54) AUTOMATED VEHICLE WITH OPTIMIZED DRIVING PROFILES

(71) Applicants: VOLKSWAGEN AG, Wolfsburg (DE); AUDI AG, Ingolstadt (DE)

(72) Inventor: Kaushik Raghu, Redwood City, CA (US)

(73) Assignees: Volkswagen AG (DE); Audi AG (DE)

(*) Notice: Subject to any disclaimer, the term of this patent is extended or adjusted under 35 U.S.C. 154(b) by 255 days.

(21) Appl. No.: 15/069,502

(22) Filed: Mar. 14, 2016

(65) Prior Publication Data

US 2017/0261991 A1 Sep. 14, 2017

(51) Int. Cl.
*G05D 1/02* (2006.01)
*B60W 30/00* (2006.01)

(52) U.S. Cl.
CPC .......... *G05D 1/0217* (2013.01); *B60W 30/00* (2013.01); *G05D 1/0223* (2013.01); *G05D 2201/0213* (2013.01)

(58) Field of Classification Search
CPC .............. G05D 1/0217; G05D 1/0223; G05D 2201/0213; B60W 30/00
USPC ......................................................... 701/23
See application file for complete search history.

(56) References Cited

U.S. PATENT DOCUMENTS

2004/0225421 A1 11/2004 Wu
2013/0096792 A1* 4/2013 Maier .................. B60W 10/02
701/65

FOREIGN PATENT DOCUMENTS

| DE | 102009058393 A1 | 9/2010 |
| DE | 102010030346 A1 | 12/2011 |
| DE | 102011054340 A1 | 4/2012 |
| DE | 102012219863 A1 | 4/2014 |
| DE | 102015104342 A1 | 10/2015 |
| EP | 2 957 474 A1 * | 12/2015 |
| EP | 2957474 A1 | 12/2015 |

OTHER PUBLICATIONS

Search Report for European Patent Application No. 17157730.7; dated Aug. 14, 2017.

* cited by examiner

*Primary Examiner* — Aaron L Troost
*Assistant Examiner* — Paula L Schneider
(74) *Attorney, Agent, or Firm* — Barnes & Thornburg LLP

(57) ABSTRACT

The present disclosure includes automated vehicles having optimized driving profiles including optimized speed profiles for execution between obstacles in consideration of economy of operation, and methods thereof.

18 Claims, 3 Drawing Sheets

AUTOMATED VEHICLE WITH OPTIMIZED DRIVING PROFILES

FIELD

The present disclosure relates to systems, components, and methodologies for automated vehicle operation. More particularly, the present disclosure relates to systems, components, and methodologies for optimization of automated vehicle operation.

BACKGROUND

Automated vehicles can operate without personal operators by receiving and responding to operational information. Automated vehicles that conduct driving operations on roadways can receive and respond to roadway information such as traffic flow devices, other vehicles, roadway signs, and various other roadway-related information and obstacles. Automated vehicles that conduct driving operations can determine that an adjustment to a current driving profile is desired, for example, that an evasive action is needed to prudently continue driving operations, and can execute the adjusted driving profile accordingly. Such automated vehicles can determine and execute the adjusted driving profiles based on information received.

SUMMARY

According to the present disclosure, systems, components, and methodologies are provided for improvements in operation of an automated vehicle.

In illustrative embodiments, an automated vehicle may determine and execute an optimized driving profile in consideration of the frequency of obstacles, such as stop signs, to be encountered along the driving path. The automated vehicle may include a control system adapted to determine and execute an optimized driving profile upon a determination that the frequency of obstacles to be encountered would impact the economy of the automated vehicle's operation. Frequent obstacles may include obstacles that impose on the automated vehicle a need for multiple stops within a relatively short distance to each other along the driving path.

In illustrative embodiments, the automated vehicle may determine a transition distance between obstacles along the driving path in considering the degree of impact on the economy of the automated vehicle's operation. The optimized driving profile may include an optimized speed profile determined at least partly based on the transition distance. The degree of impact on the economy of the automated vehicle's operation may include consideration of the automated vehicle's fuel consumption and/or generated exhaust products. In illustrative embodiments, the optimized speed profile may include both acceleration and deceleration periods.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION OF THE DISCLOSED EMBODIMENTS

Automated vehicles, including automotive vehicles that can operate without the active input of a personal operator, can increase transportation related safety. Automated vehicles can obtain information such as indications of roadway conditions, obstacles (e.g., signs and/or obstructions), and other vehicles, to determine and execute driving profiles. Automated vehicles often can obtain information locally from the roadway and surroundings such as, for example, by sensing obstacles in the roadway, and can obtain information from remote sources such as, for example, information regarding traffic from a broadcast source. Automated vehicles can determine and execute driving profiles to automatedly operate the vehicle based on the obtained information without input from any personal operator.

During vehicle operation, encountering frequent obstacles over a short distance can present an inefficient driving scenario such as, for example, encountering multiple stop signs in relatively close proximity to each other along the driving path. Such frequent obstacles require repeated slowdowns and/or stops. Although these repeated slowdowns and/or stops may be desirable to the safety and/or efficiency of the greater transportation network, repeated slowdowns and/or stops require an individual vehicle to also accelerate repeatedly to continue driving. For example, multiple stop signs in a short proximity require multiple vehicle stops each followed by an acceleration period to reassume driving after each stop. For vehicle's having an internal combustion source generating propulsion (directly and/or indirectly), the vehicle's fuel economy can decrease and exhaust products can increase with increasing number and intensity of accelerations along the same distance. Automated vehicles can experience and/or exacerbate inefficient driving scenarios by failing to appreciate the impact of frequent obstacles to the vehicle's economy of operation along the driving path.

Figure 1:
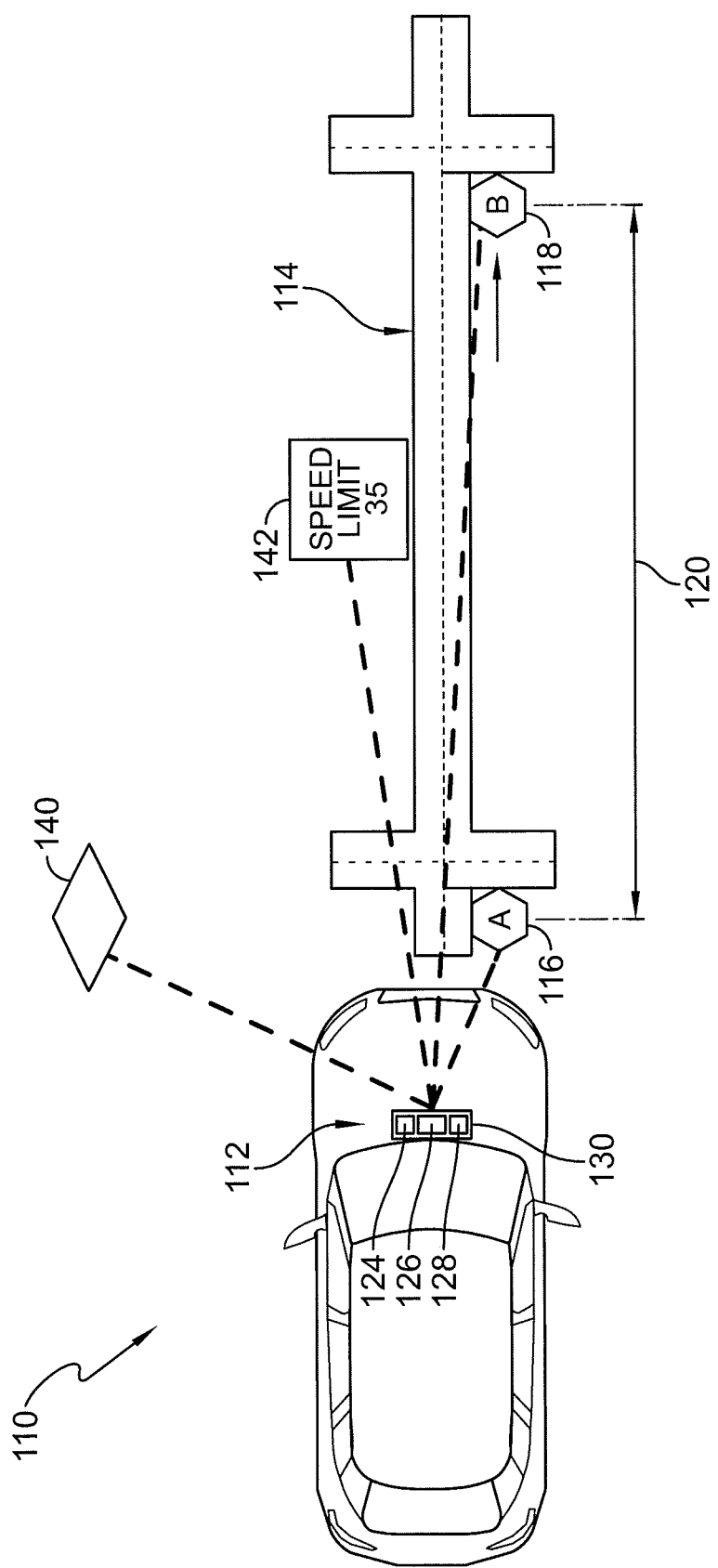
FIG. 1 is a schematic top plan view of an automated vehicle positioned at a first obstacle position and showing that the automated vehicle obtains information regarding a second obstacle position.

Referring to FIG. 1, an automated vehicle 110 is illustratively located on a public roadway 114. The automated vehicle 110 is illustratively located at a first obstacle position 116 that is embodied as a first stop sign. In the illustrative embodiment, the automated vehicle 110 determines that a second obstacle position 118, embodied as a second stop sign, imminently follows the first obstacle position 116. As described in additional detail below, the automated vehicle 110 may determine a transition distance 120 between the obstacle positions 116, 118, and determine and execute a desired speed profile 122 based on the transition distance 120. The desired speed profile 122 may be an optimized speed profile determined with consideration for the inefficiencies associated with frequent obstacles (e.g., stops) encountered by the automated vehicle.

The automated vehicle 110 may include a control system 112 for performing automated vehicle operation. The control system 112 may obtain information, and determine and execute driving profiles to operate the automated vehicle 110 on the roadway 114 according to the informed obtained. In the illustrative embodiment, the driving profiles may include the desired speed profile 122 as determined and executed according to an economy profile EP. The economy profile EP may include predictive values of one or both of fuel consumption and generated exhaust products based on the transition distance 120. Accordingly, the inefficiencies associated with frequent obstacles can be reduced by customizing the desired speed profile 122 based on the transition distance 120.

As described in additional detail below, the control system 112 may obtain information pertaining to the roadway 114 including the location of the first obstacle position 116 and the location of a second obstacle position 118. The control system 112 may determine the transition distance 120 between the first obstacle position 116 and the second obstacle position 118 based on the obtained information. The control system 112 may determine and execute the desired speed profile 122 (shown by example in FIG. 3) based on the transition distance 120.

In the illustrative embodiment, the desired speed profile 122 may include periods of one and/or more of acceleration, coast, and deceleration. The desired speed profile 122 may include automated operation of the automated vehicle 110 along the transition distance 120 in consideration of the economy profile EP and while observing applicable traffic laws. As described in more detailed below, the desired speed profile 122 may include a desired maximum speed 136.

The control system 112 may determine the desired speed profile 122 as a function of the economy profile EP based on the transition distance 120, as $$SP\ 122_{TD\ 120} = f(EP(TD\ 120)).$$

As mentioned above, the economy profile EP may include predicted values of at least one of fuel consumption $\eta$ and generated exhaust products $\varepsilon$ based on the transition distance 120, as EP (TD 120)=$f(\eta_{TD\ 120}, \varepsilon_{TD\ 120})$. The fuel consumption $\eta$ and generated exhaust products $\varepsilon$ are may embodied to include historic time-weighted averages that are determined, stored, and updated by the control system 112. In some embodiments, the economy profile EP may be based on any of past, present, or predictive analysis of new and/or existing information, and/or any combinations thereof. In some embodiments, in determining the desired speed profile 122, the control system 112 may consider any of speed restrictions (e.g., speed limits) along the transition distance 120, the curvature and/or elevation changes in the roadway 114 along the transition distance 120, the current weather conditions, other vehicles (e.g., presence, absence, location, and/or speed, etc.), comfort of vehicle occupants, gross vehicle weight, tow loads, the travel time, and/or combinations thereof along the transition distance 120. In the illustrative embodiments, the desired speed profile 122 and the economy profile EP may be determined by the control system 112 according to at least one algorithm, but in some embodiments may include the use of lookup tables, charts, and/or combinations thereof.

The control system 112 may execute the desired speed profile 122 to automatedly operate the automated vehicle 110 between the first and second obstacle positions 116, 118. In the illustrative embodiment, the control system 112 includes at least one of each of a processor 124, a memory device 126, and a communication device 128 in communication with each other. The processor 124 may execute instructions stored on the memory device 126 based on information obtained by the communication device 128 to perform automated operation of the automated vehicle 110.

The communication device 128 may include at least one sensor 130, embodied as a camera, for receiving and sending information to the processor 124 to determine the existence and relative positions of roadway information (e.g., speed limit signs 142) and/or obstacles (e.g., stop signs). In the illustrative embodiment, the communication device 128 obtains an image of roadway 114 including the second obstacle position 118 and communicates the information to the processor 124. The processor 124 may execute software stored on memory device 126 to identify the second obstacle position 118 as an obstacle, to determine the transition distance 120, to determine the economy profile EP and the desired speed profile 122, and to execute the desire speed profile 122. In some embodiments, the communication device 128 of the control system 112 may include components of any of a radar system, a Lidar system, a Global Positioning System (GPS), and/or a navigation system (e.g., map-based). In some embodiments, the control system 112 may include hardware and/or software configured to communicate with remote systems 140 that are remote to the automated vehicle 110 to obtain information such as, for example, GPS satellites, public and/or private roadway information systems, and/or other vehicles.

In the illustrative embodiment, the control system 112 may communicate with onboard vehicles systems to determine whether the automated vehicle 110 is stopped at the first obstacle position 116, and the obstacle positions 116, 118 are embodied as stop signs at which the automated vehicle 110 must lawfully stop. The control system 112 may obtain information indicative of the current speed and acceleration, engine speed (e.g., Rotations Per Minute (RPM)), and the current gear selection of the automated vehicle 110 and may determine a current speed profile of the automated vehicle 110 based on the information obtained. The control system 112 may determine whether the automated vehicle 110 is stopped at a first obstacle position 116 based on the current speed profile, for example, occurring at a stationary speed profile. In some embodiments, the automated vehicle 110 may detect the first obstacle position 116 directly and/or indirectly. In some embodiments, the control system 112 may operate the automated vehicle 110 for the desired speed profiles 122 in combination with other driving features such as, for example, adaptive cruise control, cruise assist, traffic jam assist, and/or traffic jam pilot. In some embodiments, the control system 112 may determine the desired speed profile 122 based on the current speed profile of the automated vehicle 110 indicating that the automated vehicle 110 is not stationary.

It should be understood that in some embodiments, the obstacle positions 116, 118 each may include any variety and number of obstacles having a likelihood of requiring automated vehicle 110 to have to adjust the current driving profile (including speed profile) such as, for example, traffic control signals, speed bumps, crosswalks and/or pedestrians, roadway curves, turns, intersections, other vehicles, destinations, changes in roadway conditions and/or laws, and/or safety zones (e.g., work, school, and/or hospital zones, etc.) and the desired speed profile 122 and/or economy profile EP may be determined based on the current speed profile. For example, the current speed profile may include consideration of the first obstacle position 116 embodied as a speed bump in the roadway which does not require a complete stop of automated vehicle 110, and the second obstacle position 118 embodied as a work zone imposing a reduce speed requirement than the speed limit of the roadway 114 preceding the work zone. Rather than traversing the first obstacle position 116 (speed bump) and accelerating to the speed limit, the automated vehicle 110 may determine that the second obstacle position 118 is significant and/or close enough that little or no acceleration is desired after traversing the speed bump before entering the work zone. The consideration of the frequency of obstacles can reduce ineffective acceleration and improve the economy of operation of the automated vehicle 110.

Figure 2:
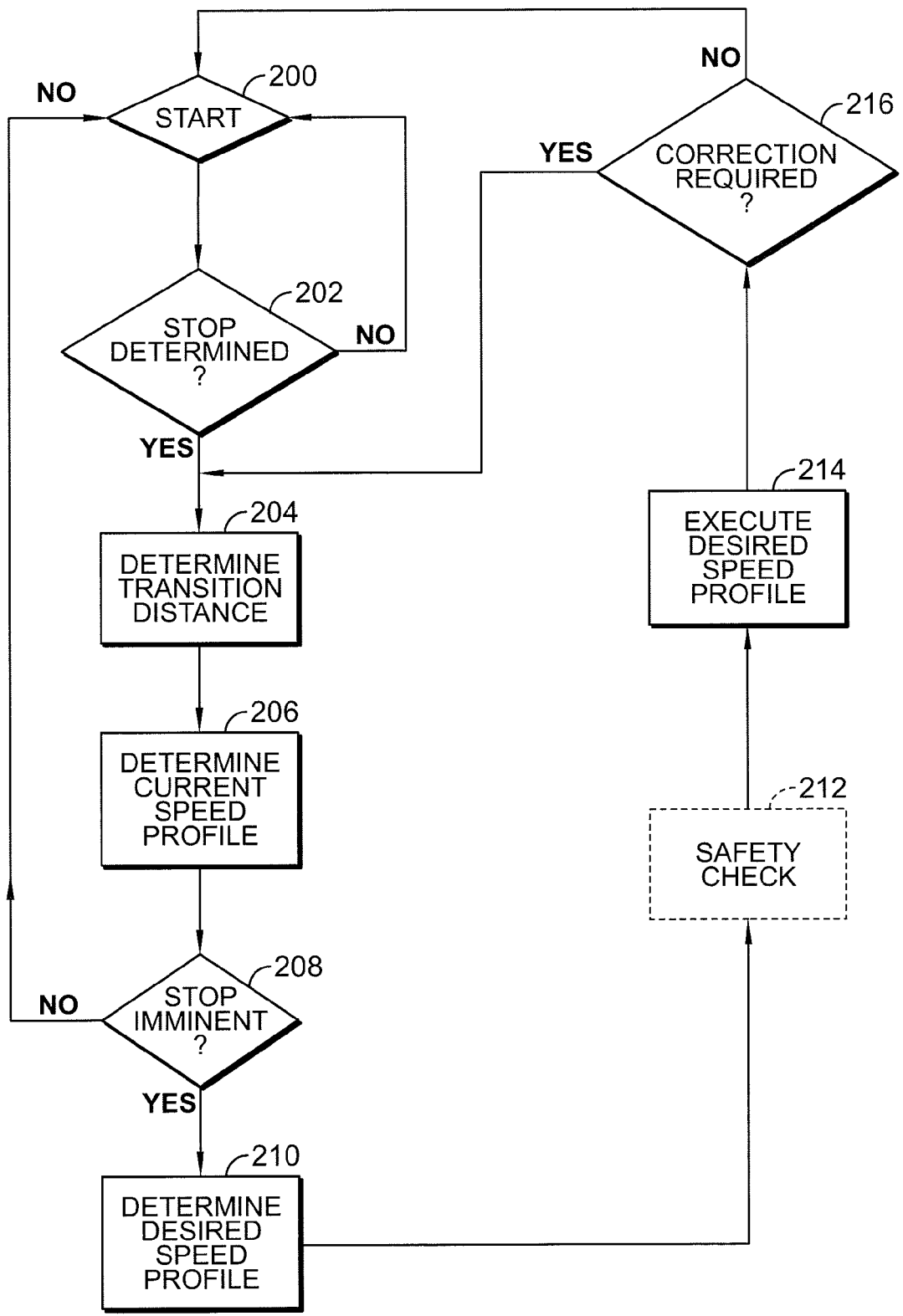
FIG. 2 is a process flow diagram showing a process of operating the automated vehicle of FIG. 1 according to an optimized speed profile.

As shown in the process flow diagram of FIG. 2, and described in detail below, operations performed at 200-216 illustrate one example of automated operation of the automated vehicle 110 in accordance with the disclosed embodiments. At 200-204, the existence of a subsequent (second) obstacle position 118 and the transition distance 120 between the current (first) obstacle position 116 and the subsequent (second) obstacle position 118 may be determined. At 206, the current speed profile is determined, and at 208, the imminence of the subsequent (second) obstacle position 118 is determined. At 210, the desired speed profile 122 may be determined. At 212-216, the desired speed profile 122 is executed (214) including a safety check (212) and an error correction operation (216).

More specifically, at 200, a start sequence of the process is initiated. In the illustrative embodiment, the start sequence initiates in response to a determination by the control system 112 that the automated vehicle 110 is at a current (first) obstacle position 116. In some embodiments, the start sequence may include initial activation of the automated vehicle 110 such as, for example, keyed ignition of an internal combustion engine of the automated vehicle 110, a request generated by the control system 112 based on obtained information such as, for example, roadway information sent from an information source, a location from a global positioning system, and/or operator input.

Control then proceeds to 202, at which the automated vehicle 110 may determine whether a subsequent (second) stop exists. As mentioned above, operations performed at 202 may include the control system 112 determining the existence of the subsequent (second) obstacle position 118 by sensing a relevant obstacle within the range of the communication device 128. If a subsequent (second) obstacle position 118 is not determined, the process returns to the start sequence at 200. If a subsequent (second) obstacle position 118 is determined to exist, the process proceeds to 204.

At 204, the automated vehicle 110 determines the transition distance 120. In the illustrative embodiment, the control system 112 obtains the image of the subsequent (second) obstacle position 118 and determines the transition distance 120 based on the information obtains. Control may then proceed to 206.

At 206, the automated vehicle 110 may determine a current speed profile. In the illustrative embodiment, the control system 112 may determine the current speed profile based on the current speed and acceleration, the engine RPM, and the current gear selection of the automated vehicle 110. Control may then proceed to 208.

At 208, the automated vehicle 110 may determine whether the subsequent (second) obstacle position 118 is imminent. In the illustrative embodiment, the control system 112 may determine whether the subsequent (second) obstacle position 118 is imminent based on qualifying criteria such that the subsequent (second) obstacle position 118 is immediately important to the economy profile EP. The qualifying criteria for imminence may include when the subsequent (second) obstacle position 118 is within the operational range of the communication device 128 of the control system 112, may embodied as within the detection range of the control system 112. However, it should be understood that the qualifying criteria may include a threshold of transition distance 120 determined based on the current speed profile, a user input (for example, a selection of a level of automated driving aggressiveness), gross vehicle weight, tow loads, other economy related factors, and/or combinations thereof. If the control system 112 determines that the subsequent (second) obstacle position 118 is not imminent, control may return to the start sequence 200. If the control system 112 determines that the subsequent (second) obstacle position 118 is imminent, control may proceed to 210.

At 210, the automated vehicle 110 may determine the desired speed profile 122. In the illustrative embodiment, the control system 112 may determine the desired speed profile 122 in consideration of the economy profile EP and the transition distance 120 as described above. The process may then proceed to 212.

At 212, the automated vehicle 110 may perform a safety check, which may be performed by control system 112 to reduce potential for driving errors associated with any particular model of automated driving execution and include performing a confirmation that information obtained by control system 112 is within an expected range, but in some embodiments may include any number of operations for preventing unsafe and or undesirable driving conditions, for example, collision. In some embodiments, operations performed at 212 may be excluded, may be performed any number of times, may be performed in parallel and/or in series with other steps, and/or may be performed at any one or more intervals along the process. Control then proceeds to 214, at which the automated vehicle 110 may execute the desired speed profile. In the illustrative embodiment, the control system 112 may communicate with vehicle controls (e.g., engine, transmission, steering controls, accelerator, brakes, communication systems, etc.) to operate the automated vehicle 110 according to the desired speed profile 122.

Control proceeds to 216, at which the automated vehicle 110 may determine whether any correction of the desired speed profile 122 is required. In the illustrative embodiment, the control system 112 may obtain information regarding the local environment to determine if a correction is required. For example, if a new obstacle appears, such as another vehicle in the immediate vicinity changes course in a manner that exceeds a threshold proximity to the automated vehicle 110, the control system 112 may determine that a correction is required and returns to 204. In some embodiments, the control system 112 may determine a correction is required based on any past, present, or predictive analysis of new and/or existing information, and/or any combinations thereof. If instead no correction is determined, the process returns to the start sequence at 200.

It should be understood that in some embodiments, the obstacle positions 116, 118 each may include any variety and number of obstacles having a likelihood of requiring automated vehicle 110 to have to adjust the current driving profile (including speed profile) such as, for example, traffic control signals, speed bumps, crosswalks and/or pedestrians, roadway curves, turns, intersections, other vehicles, destinations, changes in roadway conditions and/or laws, and/or safety zones (e.g., work, school, and/or hospital zones, etc.) and the desired speed profile 122 and/or economy profile EP may be determined based on the current speed profile. In some embodiments, the control system 112 may operate the automated vehicle 110 for the desired speed profiles 122 in combination with other driving features such as, for example, adaptive cruise control, cruise assist, traffic jam assist, and/or traffic jam pilot. In some embodiments, the control system 112 may determine the desired speed profile based on the current speed profile of the automated vehicle 110 indicating that the automated vehicle 110 is not stationary.

Figure 3:
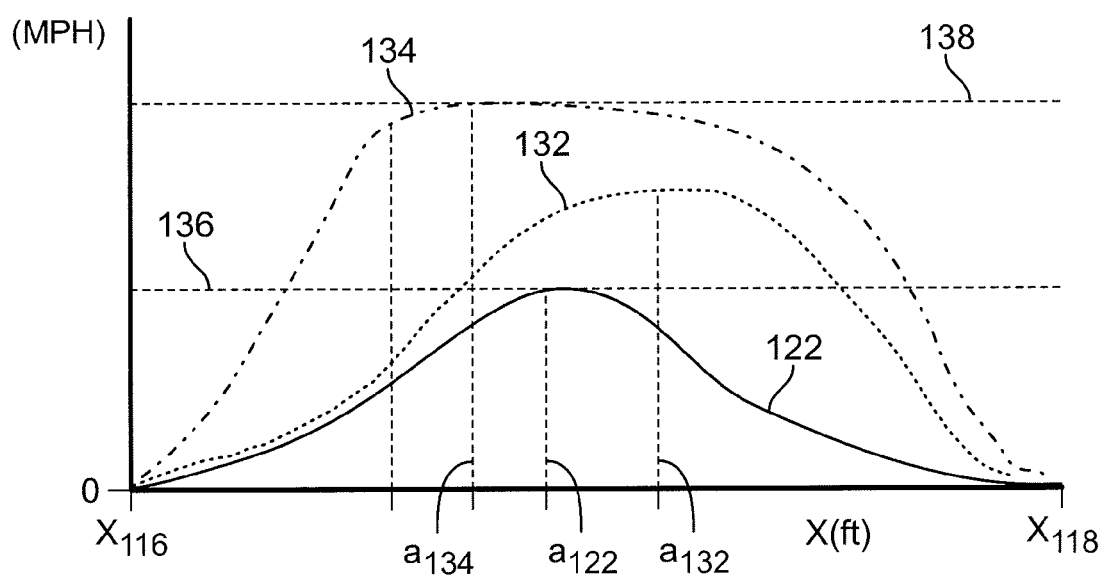
FIG. 3 is an exemplary depiction of vehicle speed profiles represented as speed versus distance for each of a non-automated vehicle, an automated vehicle without optimized driving profiles, and the automated vehicle with optimized speed profile of FIG. 1.

Referring to FIG. 3, a graph illustrating the speed (miles per hour, mph) of a vehicle compared to a position (x) between a current (first) obstacle position 116 at $x_{116}$ and a subsequent (second) obstacle position 118 at $x_{118}$. The desired speed profile 122 is may be shown in comparison to an exemplary automated vehicle speed profile 132 and an exemplary personal operator speed profile 134. The exemplary automated vehicle speed profile 132 represents an example of a vehicle operated automatedly, but without the optimized driving profiles described herein. The exemplary personal operator speed profile 134 represents an example of a vehicle actively operated by a driver without automated operation.

The desired speed profile 122 of the automated vehicle 110 may show acceleration from the current (first) obstacle position 116 at $x_{116}$ to a desired maximum speed 136 may achieved at $a_{122}$ and then proceeds to coast and decelerate gradually to approach to the subsequent (second) obstacle position 118 at $x_{118}$. The desired maximum speed 136 may be determined by the control system 112 as an element of the speed profile 122 according to the economy profile EP as discussed above. The exemplary personal operator speed profile 134 may rapidly accelerate to a speed limit 138 (illustratively embodied as the posted speed limit along the transition distance 120) achieved at $a_{138}$ and then proceed to coast and decelerate rapidly upon approach to the subsequent (second) obstacle position 118 at $x_{118}$. The exemplary automated vehicle speed profile 132 may accelerate less rapidly than the exemplary personal operator speed profile 134 and to a maximum speed lower that the speed limit 138 achieved at $a_{132}$, but may exceed the desired maximum speed 136 requiring additional deceleration before arriving at the subsequent (second) obstacle position 118 at $x_{118}$. The speed profiles 122, 132, 134 and the speed limit 138 and desired maximum speed 136 are illustrative and are not intended to limit the scope of the present disclosure to any particular relationship therebetween, nor to any particular relationship between distance, speed, and/or any other factor directly and/or indirectly indicated by the graphical depiction.

Although the above descriptions include deceleration, it should be understood that in some embodiments, it is within the present disclosure that the obstacle positions 116, 118 may include obstacles that create a desire for immediate acceleration based on the economy profile EP and the transition distance 120 such as, for example, the subsequent (second) obstacle position 118 may be a traffic signal and the control system 112 may be configured to determine that timing of the traffic signal preferably creates a speed profile 122 based on the economy profile EP having an immediate acceleration to lawfully pass through the traffic signal before the traffic signal would require the automated vehicle 110 to stop. In some embodiments, the control system 112 may obtain information from either or both of on-vehicle and off-vehicle sources, for example, in determining the timing of the traffic signal, the control system 112 may communicate remotely with the traffic signal or other source of information regarding the particular traffic signal. In some embodiments, the speed profile 122 may include any other such sequence of lawful vehicle operation based on the economy profile EP according to current information.

The present disclosure includes embodiments that can optimize operation according to economy, such as economy of fuel consumption and/or generated exhaust products. In some embodiments, economy may include consumption of any motive force including electrical power consumption/generation either directly, for example, of an electrical motor, and/or indirectly, for example, to a fuel generation source such as a hydrogen cell, and/or combinations thereof. It is within the present disclosure to monitor, store, calculate, apply, evaluate, and/or share such economy information for record keeping, compliance, use-based reporting and/or evaluation, other informational purposes, and/or combinations thereof, whether for personal and/or third party use including governmental use, and/or with anonymous, semi-anonymous, and/or identified context.

In some embodiments, the control system 112 performs automated operation of automated vehicle 110 according to the speed profile 122 in response to information that is obtained by the control system 112 when the automated vehicle 110 is in relatively close proximity to the obstacle positions 116, 118. In some embodiments, the speed profile 122 may be determined according to a predicted route for the automated vehicle 110, for example, upon a predetermined navigation, and may be updated according to information obtained by the automated vehicle 110 during execution of the route.

The present disclosure includes devices, systems, and methodologies for improvements in comparison to existing and basic implementations of technology that involve the following: after stopping at the stop sign for intersection, a self-driving vehicle accelerates gradually until it reaches the posted speed limit of 35 mph. As soon as it detects the next stop sign near B, it will begin to decelerate by braking, until the vehicle comes to a full rest. This manner of operation causes unnecessary acceleration up to the speed limit, even though the vehicle is going to brake imminently and begin decelerating. This manner of operation can create unnecessary fuel consumption and/or unnecessary $CO_2$ and other exhaust emissions.

The present disclosure includes, among other things, technological solutions to new problems in the self-driving world, and to new problems related to automated vehicles which do not exist in the market today. A problem exists in automated vehicle operation because the frequency of obstacles is not properly considered in transitioning the vehicle between successive obstacles which creates unnecessarily acceleration and/or unnecessary gear changes, decreasing fuel economy, and/or increasing generated exhaust emissions (e.g., $CO_2$ emissions). The present disclosure includes technical solutions for optimizing driving profiles to account for the frequency of obstacles and executing optimized driving profiles in consideration of the frequency of obstacles to reduce unnecessary acceleration and/or unnecessary gear changes, increase fuel economy, and/or reduce pollutant emissions (e.g., $CO_2$ emissions), while improving overall smooth driving experience. Another problem exists in the need for determining and monitoring fuel consumption and/or generated emissions of individual vehicles. The present disclosure includes technological solutions including platforms for determining and monitoring fuel consumption and/or generated emissions from individual vehicles for record keeping, compliance, use-based reporting and/or evaluation, other informational purposes, and/or combinations thereof.

The present disclosure includes systems, devices, and method for navigating obstacles which may include any of physical and/or informational obstructions, impediments, traffic control devices and/or other barriers, for example, including physical barricades as well as signs, traffic lights, instructions, and/or general roadway conditions encouraging and/or requiring evasive action including slowing, stopping, yielding, change in direction, change in speed and/or acceleration, and/or combinations thereof.

The present disclosure includes illustratively uses vehicle speed, GPS, navigation database, camera or other sensing technology, to determine that the vehicle is at an intersection currently. Illustratively using GPS, navigation database, camera or other sensing technology to determine that there is a reason to stop the vehicle shortly, such as upcoming stop sign, upcoming intersection, upcoming traffic jam, nearing intended destination etc. Illustratively, an upcoming curve, turn, construction may also be a reason to stop or slow down.

The present disclosure may include software in a vehicle adapted to determine the distance between current position of the vehicle, and the imminent upcoming stopping situation. Current prevailing speed limit on the road may be may determine using sensors such as camera, radar, lidar or navigation database. Software in the vehicle may utilize any one or more of current speed, engine RPM, current gear and/or acceleration/deceleration to compute current speed profile. The software in the vehicle can compute an optimal speed profile, based on the current conditions, that can minimize fuel consumption, minimize discomfort, while maintaining acceptable travel time to the next stop. The optimal acceleration and/or speed profile can be applied to achieve optimal operation.

The present disclosure includes self-driving cars that can execute an optimal speed profile for acceleration and/or deceleration providing improved performance. The vehicles may include various components and/or systems to determine the imminent stop, including onboard sensors such as camera, radar, lidar; databases such as navigation, hi-resolution maps, cloud; and/or combinations of user inputs (for example, using touch screen, conventional input or voice recognition), and/or combination thereof.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

What is claimed is:

1. An automated transportation vehicle system comprising:
   a transportation vehicle; and
   an automated vehicle control system configured to perform automated operation of the transportation vehicle on public roadways;
   wherein the automated vehicle control system determines a transition distance between a current transportation vehicle stop position corresponding to a first public roadway obstacle, and a subsequent transportation vehicle stop position corresponding to a second public roadway obstacle, determines a desired speed profile between the current transportation vehicle stop position and the subsequent transportation vehicle stop position based on the determined transition distance, wherein the desired speed profile is determined based on an economy profile of at least one of fuel consumption and generation of exhaust products, and performs automated operation of the transportation vehicle on public roadways in response to determination of the desired speed profile to achieve the desired speed profile.

2. The automated transportation vehicle of claim 1, wherein the automated vehicle control system determines the transition distance, and determines and executes the desired speed profile, without interaction with an occupant of the transportation vehicle.

3. The automated transportation vehicle of claim 1, wherein determining the transition distance is performed based on data received from at least one of an on-vehicle camera, an on-vehicle radar system, an on-vehicle lidar system, a GPS system, and a navigation system included in the automated transportation vehicle.

4. The automated transportation vehicle of claim 1, wherein the desired speed profile includes both acceleration and deceleration data points.

5. The automated transportation vehicle of claim 1, wherein the automated vehicle control system is configured to determine whether the vehicle is stopped at the first roadway obstacle.

6. An automated transportation vehicle comprising:
   a transportation vehicle chassis adapted for driven motion via a propulsion system; and
   a means for controlling automated operation of the transportation vehicle on public roadways, wherein the means for controlling automated operation determines a transition distance between a current vehicle stop position corresponding to a public roadway obstacle, and a subsequent vehicle stop position corresponding to another public roadway obstacle, determines a desired speed profile between the current transportation vehicle stop position and the subsequent transportation vehicle stop position based on the determined transition distance, wherein the desired speed profile is determined based on an economy profile of at least one of fuel consumption and generation of exhaust products, and performs automated operation of the transportation vehicle on public roadways in response to determination of the desired speed profile to achieve the desired speed profile.

7. The automated transportation vehicle of claim 6, wherein the means for controlling is configured to determine the transition distance based on data received from at least one of an on-vehicle camera, an on-vehicle radar system, an on-vehicle lidar system, a GPS system, and a navigation system included in the automated transportation vehicle.

8. The automated transportation vehicle of claim 6, wherein the desired speed profile includes both acceleration and deceleration data points.

9. The automated transportation vehicle of claim 6, wherein the means for controlling automated operation of the transportation vehicle on public roadways determines whether the transportation vehicle is stopped at the roadway obstacle.

10. A method of operating an automated transportation vehicle on public roadways, the method comprising:
   determining a transition distance between a current transportation vehicle stop position corresponding to a public roadway obstacle;
   determining a desired speed profile between the current transportation vehicle stop position and the subsequent transportation vehicle stop position based on the determined transition distance and an economy profile of at least one of fuel consumption and generation of exhaust products; and
   in response to determining the desired speed profile, performing automated operation of the transportation vehicle on public roadways to achieve the desired speed profile.

11. The method of claim 10, wherein determining the transition distance is performed based on data received from at least one of an on-vehicle camera, an on-vehicle radar system, an on-vehicle lidar system, a GPS system, and a navigation system included in the automated transportation vehicle.

12. The method of claim 10, wherein the desired speed profile includes both acceleration and deceleration data points.

13. The method of claim 10, further comprising determining whether the transportation vehicle is stopped at the roadway obstacle.

14. A method of controlling automated operation of a transportation motor vehicle on public roadways, the method comprising:
   determining a transition distance between a current transportation vehicle stop position corresponding to a public roadway obstacle, and a subsequent transportation vehicle stop position corresponding to another public roadway obstacle;
   determining a desired speed profile between the current transportation vehicle stop position and the subsequent transportation vehicle stop position based on the determined transition distance and an economy profile of at least one of fuel consumption and generation of exhaust products; and
   in response to determining the desired speed profile, performing automated operation of the transportation vehicle on public roadways to achieve the desired speed profile.

15. The method of claim 14, wherein the determination of the transition distance, and determination and execution of the desired speed profile is performed without interaction with an occupant of the transportation vehicle.

16. The method of claim 14, wherein determination of the transition distance is performed based on data received from at least one of an on-vehicle camera, an on-vehicle radar system, an on-vehicle lidar system, a GPS system, and a navigation system included in the transportation vehicle.

17. The method of claim 14, wherein the desired speed profile includes both acceleration and deceleration data points.

18. The method of claim 14, further comprising determining whether the transportation vehicle is stopped at the roadway obstacle.

* * * * *